US006422256B1

(12) United States Patent
Balazy et al.

(10) Patent No.: US 6,422,256 B1
(45) Date of Patent: Jul. 23, 2002

(54) FLUID FLOW CONTROLLING

(75) Inventors: Richard D. Balazy, Terryville; Cathy L. Cowan, Canton; Mark R. Eisenmann, Burlington; Kenneth E. Frink, Prospect; Edward Kulha, Canton Center, all of CT (US)

(73) Assignee: Mott Metallurgical Corporation, Farmington, CT (US)

( * ) Notice: Subject to any disclaimer, the term of this patent is extended or adjusted under 35 U.S.C. 154(b) by 0 days.

(21) Appl. No.: 09/722,937

(22) Filed: Nov. 27, 2000

Related U.S. Application Data

(62) Division of application No. 09/168,697, filed on Oct. 8, 1998, now Pat. No. 6,152,162.

(51) Int. Cl.⁷ .................................................. G05D 7/06
(52) U.S. Cl. ........................................ 137/12; 137/487.5
(58) Field of Search ........................ 137/12, 486, 487.5

(56) References Cited

U.S. PATENT DOCUMENTS

| | | | |
|---|---|---|---|
| 2,666,297 A | | 1/1954 | Skousgaard |
| 3,335,748 A | * | 8/1967 | Klemm et al. ............... 137/501 |
| 3,807,456 A | | 4/1974 | Colletti |
| 3,841,520 A | | 10/1974 | Bryant et al. |
| 4,015,626 A | | 4/1977 | Thordarson |
| 4,118,009 A | | 10/1978 | Chmura |
| 4,327,757 A | | 5/1982 | Weevers |
| 4,462,915 A | | 7/1984 | Friedman |
| 4,565,212 A | | 1/1986 | Klein et al. |
| 4,741,359 A | | 5/1988 | Siebald |
| 4,888,114 A | | 12/1989 | Gaddis et al. |
| 4,904,285 A | | 2/1990 | Yamada et al. |
| 5,052,363 A | | 10/1991 | Stiles |
| 5,100,551 A | | 3/1992 | Pall et al. |
| 5,114,447 A | | 5/1992 | Davis |
| 5,123,439 A | | 6/1992 | Powers |
| 5,161,576 A | | 11/1992 | Hekkert et al. |
| 5,190,068 A | * | 3/1993 | Philbin ........................ 137/486 |
| 5,487,771 A | | 1/1996 | Zeller |
| 5,511,585 A | * | 4/1996 | Lee, II ........................ 138/41 |
| 5,549,272 A | | 8/1996 | Kautz |
| 5,918,616 A | | 7/1999 | Sanfilippo et al. |

OTHER PUBLICATIONS

Mott industrial, Porous metal flow restrictors. High strength. Wear resistant. Clog free Jun. 1997.
mott industrial, Mott Precision Porous Metal Flow Restrictors Engineering and product Guide, Mar. 1997.
mott high purity, Porous Metal Flow Restrictors, Jun. 1996.
mott high purity, Mott High Purity Porous Metal Flow Restrictors Jun. 1996.
Redwood Microsystems, A New Generation of HIgh Purity Gas Panels from Redwood Microsystems; Don't Replace Your Thermal Mass Flow Controllers. Eliminate Them (updated).
Redwood Microsystems, Flo–istor Specifications 1996.
Redwood Microsystems, report.html at me210abc.standford.edu, Spring, Oct. 2, 1997.
R&D Magazine, Sept. 1997, "Back to Basics–Vacuum Technology," p. 81.
Semiconductor International, "Innovative Gas Handling Technology" (undated).
MGB1000 Micro Gas Blender, Trace Analytical, Menlo Park, CA.

* cited by examiner

*Primary Examiner*—Gerald A. Michalsky
(74) *Attorney, Agent, or Firm*—Hale and Dorr LLP

(57) ABSTRACT

A method and system for controlling the rate of fluid flow. A flow restrictor having known pressure drop and flow rate characteristics provided in a passage through which the fluid, preferably a gas, flows. An upstream pressure sensor determines the pressure of fluid in the flow passage upstream of the flow restrictor. A downstream pressure sensor determines the pressure of fluid in the flow passage downstream of said flow restrictor. A pressure regulator adjusts the pressure of fluid upstream or downstream of the flow restrictor based on the pressure drop across the flow restrictor so that the actual pressure drop across the flow restrictor closely corresponds to the pressure drop associated with a desired rate of fluid flow.

12 Claims, 6 Drawing Sheets

FLUID FLOW CONTROLLING

CROSS REFERENCE TO RELATED APPLICATIONS

This application is a divisional of now pending U.S. patent application Ser. No. 09/168,697 filed on Oct. 8, 1998, now U.S. Pat. No. 6,152,162.

FIELD OF THE INVENTION

This invention relates to fluid flow controlling and, more particularly, to systems and methods for controlling gas flow.

BACKGROUND OF THE INVENTION

There are many industrial and other applications in which it is necessary to measure and control the flow rate of fluids, particularly gases. Typically, gas flow is measured and controlled using volumetric flow devices such as turbine meters, rotometers, thermal mass flow rate control devices, or sonic gas velocity orifices.

The need for precision control is particularly acute in the semiconductor industry. Computer chip manufacturing requires exact control of various process fluids and gases, including but not limited to hydrogen, silane, helium, nitrogen, oxygen and argon. The current "state of the art" in the semiconductor industry utilizes a sophisticated gas delivery system, often referred to as a gas panel incorporating "gas sticks", which includes a mass flow controller, a pressure transducer, a filter, control valves and a pressure regulator, all connected in series. The flow control portion of these systems have high initial and maintenance costs, require frequent calibration and service to avoid inaccuracies caused by electronic drift and span, and may result in inaccurate flow rates when very high or very low flow rates are required.

In situations in which repeatability is more important than absolute accuracy, precision calibrated orifices have been used to provide a constant calibrated gas flow relative to gas supply pressure; if multiple fixed flow rates are needed, a number of orifices may be connected in parallel with each other with a switching mechanism for selecting the appropriate orifice. However, the use of such orifices is normally limited to applications that require one or more constant, non-variable gas flows. Even in fixed flow applications where their use is otherwise satisfactory, such orifices require high gas velocities which cause excessive turbulence, erosion therefore and flow instability, and are subject to plugging.

Precision porous sintered metal flow restrictors, (e.g., of the type manufactured and sold by Mott Corporation, the assignee of the present application and which have hundreds of interconnected through-pores or passages arranged both in parallel and series with each other) are also used to provide a specified down-stream flow relative to the applied upstream pressure. Such flow restrictors are less susceptible to plugging, clogging and wear than are conventional orifices, operate at relatively low flow velocities, and provide a smooth and constant down-stream flow. Like orifices, however, their use has been limited to applications that require an essentially constant and non-variable flow.

There remains a need for a system that, like a thermal mass flow controller, is capable of precisely measuring and controlling fluid flow over a range of flow rates and pressures, but that is more accurate over a wide range of flow rates, is less expensive, and that requires significantly less calibration, servicing and maintenance and is less susceptible to electronic drift and span.

SUMMARY OF THE INVENTION

The present invention features a method and system for controlling the rate of fluid, and particularly gas, flow which uses pressure regulation rather than a control valve. A flow restrictor having known pressure drop-flow rate characteristics is provided in a passage through which the fluid flows, the pressure drop across the flow restrictor is determined, and the pressure drop of the fluid flowing through flow restrictor is adjusted so that the actual pressure drop across the flow restrictor will closely correspond to the pressure drop associated with a desired flow rate.

In preferred embodiments a pressure regulator adjusts the pressure of gas upstream or downstream of the flow restrictor based on the pressure drop across the flow restrictor and with reference to data defining the pressure drop-flow rate characteristics of the flow restrictor, so that the actual pressure drop will closely correspond to the pressure drop associated with a desired rate of gas flow.

In particularly preferred embodiments, the flow restrictor comprises a porous sintered metal element, an upstream pressure sensor determines and provides data indicative of the pressure of gas in the flow passage upstream of the flow restrictor, a downstream pressure sensor determines and provides data indicative the pressure of gas in the flow passage downstream of the flow restrictor, the data from the sensors is compared with data indicative of the desired rate of gas flow and the known data representing the pressure drop-flow rate characteristics of the flow restrictor, and the system controls a pressure regulator (and hence gas pressure) on the basis of the comparison.

Fluid flow controllers embodying the invention comprise a fluid flow passage in which such a flow restrictor is positioned, and pressure sensors for determining the pressure of fluid flowing in the flow passage positioned both upstream and down stream of the flow restrictor. A pressure regulator responsive to the sensors adjusts the pressure of the fluid either upstream or downstream of the flow restrictor to provide a desired pressure drop across the flow restrictors.

Preferred gas flow controllers have a pair of gas flow passages connected in parallel between the inlet to and outlet from the controller, the flow restrictor is positioned in one of the flow passages, and a valve opens and closes one of the flow passages to gas flow.

Some preferred systems are of modular construction and include a plurality of stacked rectilinear modules. Typically one of the modules defines a by-pass flow passage and includes a control valve, others of the modules define a passage including the flow restrictor, and an ultra-high efficiency gas filter may be mounted in series with the flow restrictor. An electronics module including a memory storing data representing the pressure drop-flow rate characteristics of the flow restrictor receives signals from pressure sensors and outputs a signal for controlling an upstream pressure regulator.

Other objects, features and advantages of the present invention will appear from the following detailed description of preferred embodiments thereof, taken in connection with the drawings.

DESCRIPTION OF PREFERRED EMBODIMENTS

Figure 1:
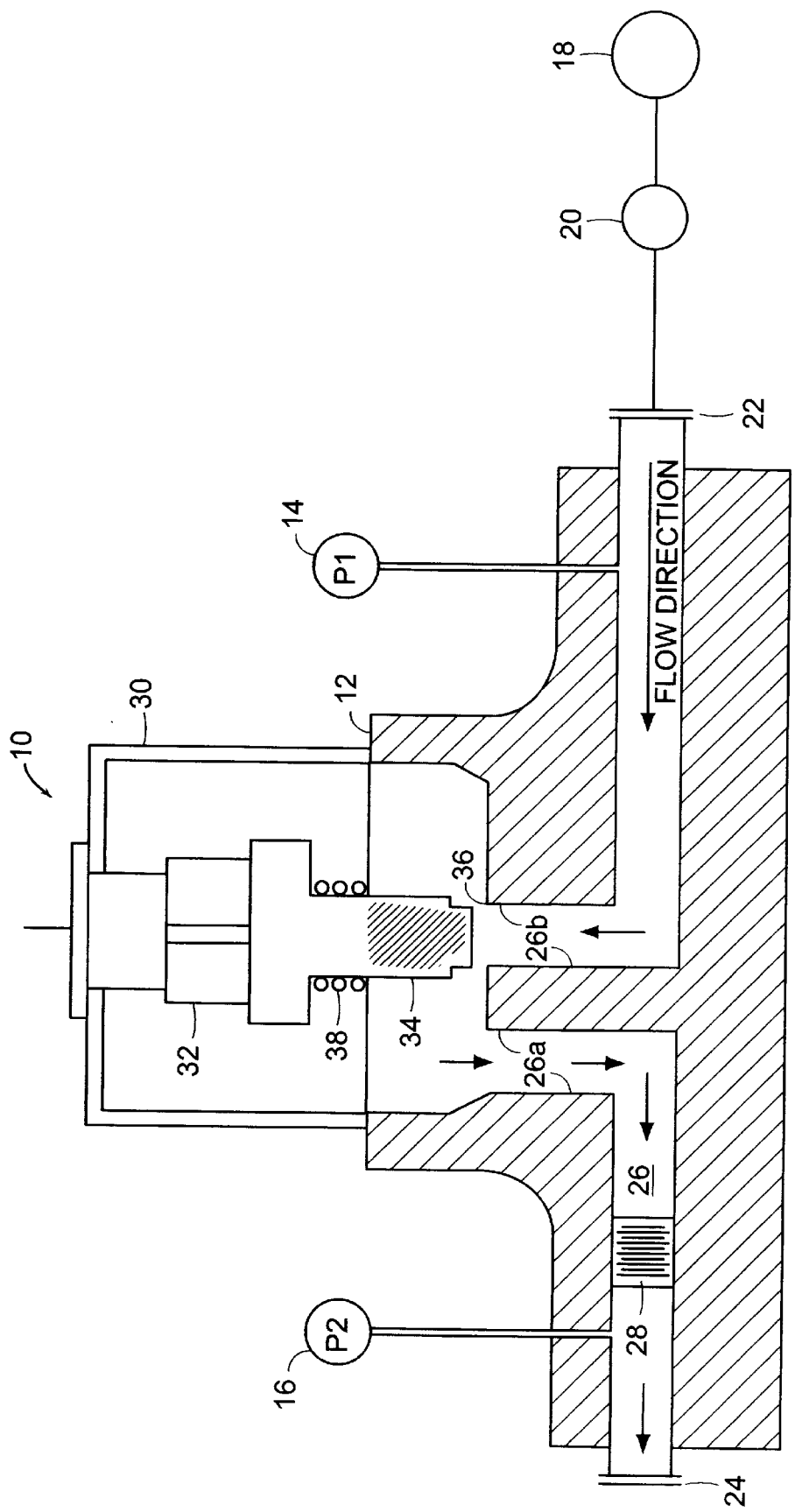
FIG. 1 is a schematic illustration, partially in section, of a flow control system embodying the present invention.

FIG. 1 shows a flow control system, generally designated 10, including a gas flow control module 12 connected in series between an upstream pressure sensor 14 and a downstream pressure sensor 16. In an alternative design, pressure sensors 14 and 16 are not part of gas flow control module 12 but are mounted in close proximity to inlet 22 and outlet 24, respectively. Gas from a source 18 flows into system 10 through a pressure regulator 20. The pressure regulator is adjustable to control the pressure of the gas flowing into the gas flow control module 12.

Flow control module 12 has an inlet 22, an outlet 24, a flow passage 26 extending between the inlet and outlet, and a porous sintered metal flow restrictor 28 mounted in the flow passage 26. A shutoff valve 30 is also provided in the flow passage. As shown, shutoff valve 30 includes a valve actuator 32 (e.g., a solenoid or driven pneumatic actuator) which controls the movement of a valve member 34 between a full open position in which the head of the valve member is spaced from a valve seat 36, and a closed position (not shown) in which the head of the valve member sits on the valve seat 36 and closes the flow passage. In the illustrated embodiment, the valve member 34 is biased (e.g., by helical spring 38, or, alternatively, by a diaphragm or bellows type mechanism) towards its closed position, so that the valve 30 will automatically close in the event of failure of power to actuator 32, designated as "normally closed." Valves can also be designed to operate as "normally open" in the event of a power failure.

Flow restrictor 28 includes a porous sintered metal element or porous sintered metal encapsulated assembly, secured in and spanning the entire width of the flow passage 26. In the illustrated embodiment, the flow restrictor 28 is mounted adjacent to the outlet 24 of flow control module 12. The position of the flow restrictor 28 within the flow passage 26 is not critical; alternatively the flow restrictor could be placed, for example, adjacent inlet 22 or in one of the short flow passage portions 26a, 26b closely upstream of or downstream from valve seat 36.

It is well known that the rate of fluid, e.g., gas or liquid, flow through a porous sintered metal element depends on the pressures upstream of and downstream from the element; the greater the pressure drop across the porous element the greater the rate of flow through the element. Thus, the rate of flow through an element can be increased by raising the pressure drop, and can be decreased by lowering it. Conventionally, the flow rate and pressure drop are varied by adjusting upstream pressure.

Figure 2:
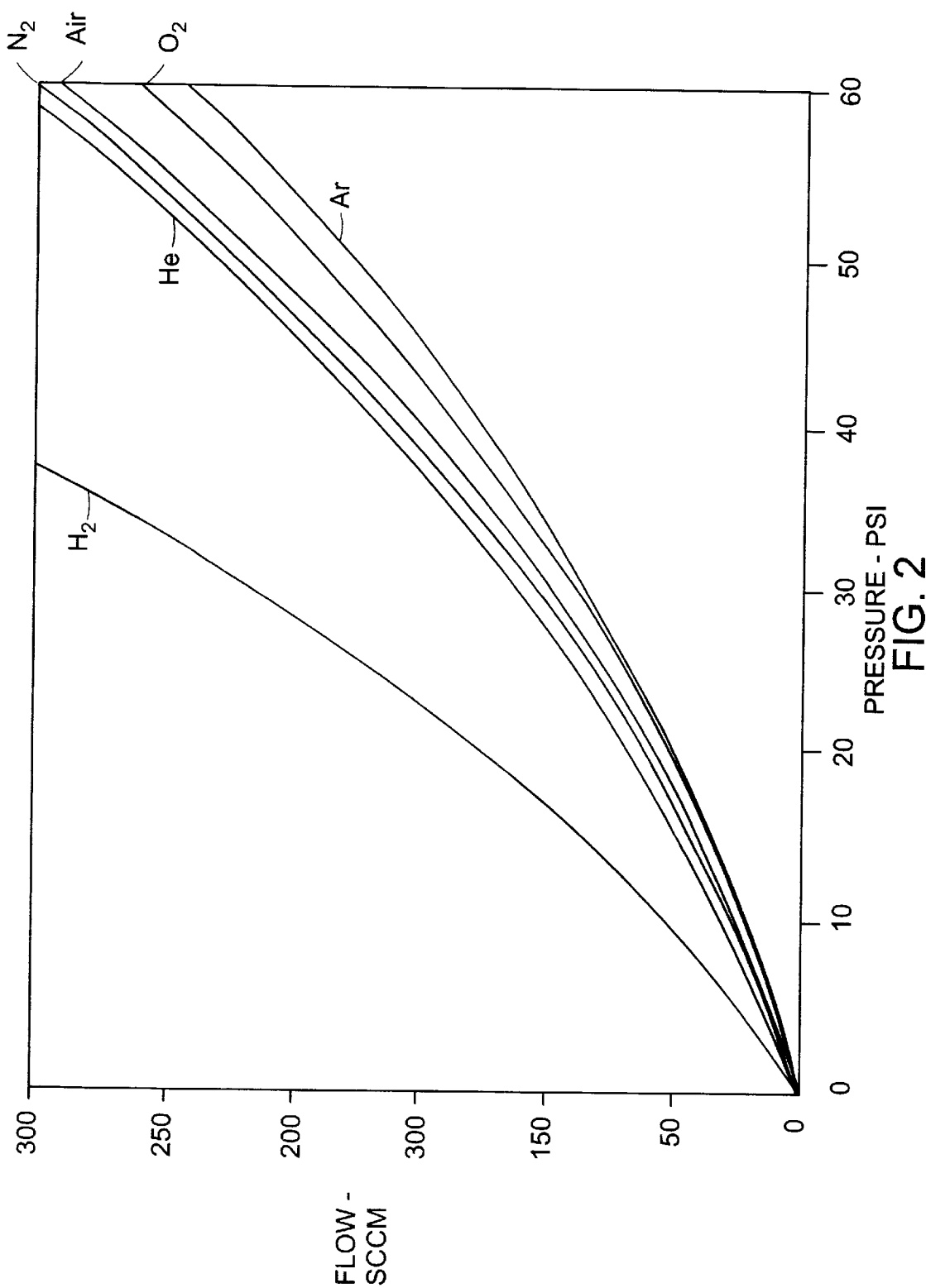
FIG. 2 is a graphical representation of the relationship between gas flow and pressure drop in the system of FIG. 1.

For any particular element, the precise relationship between flow rate and pressure drop depends, not only on the element itself, but also on the viscosity, density (if gas), and overall pressure of the particular fluid flowing through the element. For any particular fluid and pressure, the relationship between flow rate and pressure drop can be determined empirically to a high degree of accuracy (e.g., using precision volume meters and pressure gauges which are traceable to standards of the National Institute of Standards and Technology). The relationship between pressure drop and fluid flow of a typical porous sintered metal flow restrictor is shown in FIG. 2. The data in FIG. 2 illustrates the flow characteristics, for hydrogen, helium, nitrogen, air, oxygen and argon, of a standard process control Mott Corporation Flow Restrictor that is nominally rated to deliver 100 SCCM (standard cubic centimeters per minute) of nitrogen at an inlet pressure of 30 PSIG and an outlet to atmospheric pressure, i.e., when the pressure drop across the flow restrictor is 30 PSI. As shown in FIG. 2, at any given pressure drop the flow of hydrogen and helium will be greater than, and the flow of air, oxygen and argon will be less than, that of nitrogen. The flow rate of any of these gases increases, non-linearly, with increasing pressure drops; for example, when the pressure differential across the flow restrictor is 20 PSI, the flow rate of nitrogen through the flow restrictor having the characteristics are illustrated in FIG. 2 is about 60 SCCM, at a 30 PSI pressure differential it is 100 SCCM, and at 40 PSI it is about 160 SCCM. It is also evident and well-known that, for any particular pressure drop, the amount of gas flowing through the flow restrictor depends on the overall pressure level. For example, for a given flow restrictor, the rate of gas flow (e.g., volume measured in standard cubic feet or liters per unit of time in minutes) through the restrictor at an inlet pressure of 100 PSIG and an outlet pressure of 70 PSIG will be greater than the rate of flow when the inlet pressure is 30 PSIG and the outlet is at atmospheric pressure.

The data that defines the pressure drop-flow rate characteristics of a particular flow restrictor for one or more fluids is referred to as the flow restrictors Flow Rate Control Data. As a practical matter, it is desirable that the design of, and the procedures used in the manufacture of, flow restrictors used in the present invention be well-defined so that the Flow Rate Control Data for different flow restrictors of the same design, overall size and configuration will be consistent.

To control the rate of fluid flow through the system of FIG. 1, the pressures upstream and downstream of the flow restrictor 28 are monitored using pressure sensors 14, 16, the difference between the upstream and downstream pressures is determined, and the pressure of fluid flowing from pressure regulator 20 adjusted (either upwardly or downwardly, as required) so that the measured pressure drop across the flow restrictor 28 corresponds to the pressure drop required to produce the desired flow. Again using the exemplary data from FIG. 2, if the flow restrictor 28 of FIG. 1 has the Flow Rate Control Data illustrated in FIG. 2, pressure regulator 20 would be adjusted to provide a pressure drop of 20 PSI across flow restrictor 28 to atmosphere to produce a nitrogen flow of 60 SCCM, to provide a pressure drop of 30 PSI to atmosphere to produce a nitrogen flow of 100 SCCM, and to provide a pressure drop of 40 PSI to atmosphere to produce a nitrogen flow of 160 SCCM.

In many circumstances, the pressure downstream of flow restrictor 28 will be greater than atmospheric pressure and the pressure drop across the flow restrictor thus will be somewhat less than, rather than the same as, the outlet pressure of regulator 20. If, however, the outlet of the fluid flow manager 12 is sufficiently open so that the pressure downstream of flow restrictor 28 is substantially equal to atmospheric pressure, the pressure drop across the flow restrictor 28 will be substantially equal to the gage pressure indicated by inlet pressure sensor 14 (and also to the outlet pressure of regulator 20). In these circumstances it is possible in some applications not to have or utilize a downstream pressure sensor 16, and to control flow through the flow control system 10 simply by increasing the upstream pressure and assuming that the upstream gage pressure is equal to the pressure drop across flow restrictor 28. In general, however, at the same differential pressure, higher system inlet and outlet pressures will result in increased flow through the restrictor.

It will be appreciated that, using conventional powder metallurgy processing techniques, porous sintered metal flow restrictors can be made for a wide range of desired target flow rates, e.g., within 2% of a desired target flow at outlet pressures ranging from full vacuum to 100 or more PSI, by varying the size and/or structure of the porous metal element. Porous sintered metal flow restrictors can be individually calibrated to obtain tighter flow tolerances, e.g., plus or minus 0.5% or better. For example, if the target flow is 200 SCCM of a gas at a 30 PSI pressure drop, this may be accomplished either by using an element whose configuration, size and porosity are such that it has the same Flow Rate Control Data as the element that illustrated in FIG. 2 except with twice the face area, or by making a thinner or more open element. Similarly, a target flow of 100 SCCM at 20 PSI may be accomplished using a thinner or more open element or by using an element having the same Flow Rate Control Data but about 1.43 (100/70) times the face area, and a target flow of 50 SCCM at 30 PSI may be accomplished using a thicker or more closed element or an element having half the face area. Flow restrictors having a variety of different rated flows at different pressures are commercially available.

Figure 3:
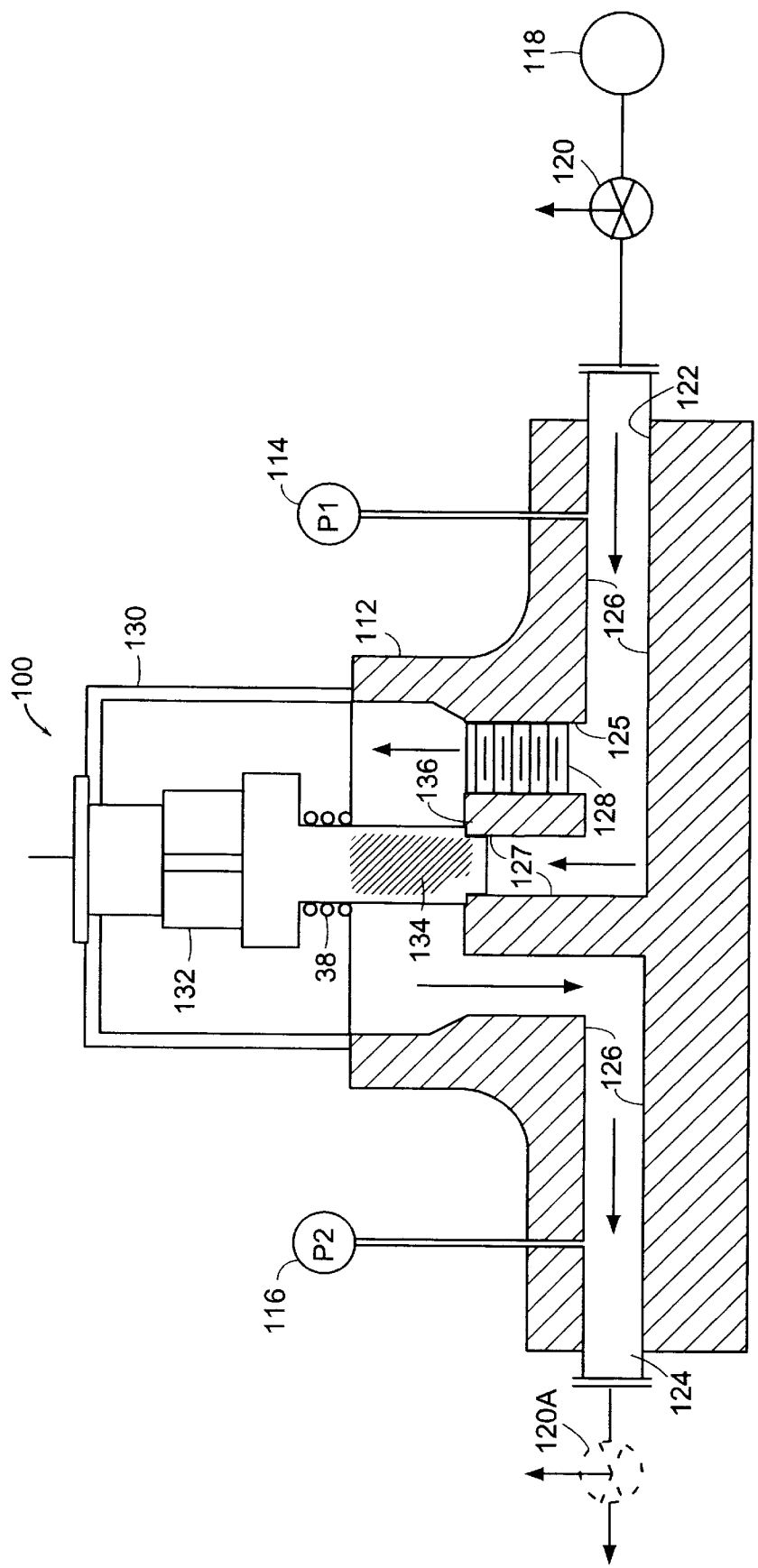
FIGS. 3, 4, 5 and 6 are schematic illustrations, partially in section, of other flow control systems embodying the present invention.

FIG. 3 illustrates a flow control system, generally designated 100, that is generally similar to the system of FIG. 1 except its valve controller controls by-pass flow rather than providing shutoff capability. The location of the flow restrictor in the FIG. 3 embodiment is more critical to the device's operation than is the case with the FIG. 1 system. Portions of system 100 that correspond to portions of system 10 are identified using the same reference number, with a "1" prefix added.

As shown, the system 100 of FIG. 3 includes a gas flow control module 112 connected in series between an upstream sensor 114 and a downstream pressure sensor 116. As with the design of FIG. 1, pressure sensors 114 and 116 may be mounted in close proximity to inlet 122 and outlet 124, respectively, rather than being part of module 112. Gas from source 118 flows into system 100 through a pressure regulator 120.

Gas flow control module 112 has an inlet 122, an outlet 124, and a flow passage 126 extending between the inlet and outlet. As shown, the central portion of flow passage 126 includes two parallel-connected flow passage portions, designated 125 and 127. A porous sintered metal flow restrictor 128 is mounted in flow passage portion 125. A shutoff valve 130 is provided in flow passage portion 127. As shown, shutoff valve 130 includes a valve actuator 132 (e.g., a solenoid or pneumatic actuator) which controls the movement of a valve member 134 between a fully open position (not shown) in which the head of the valve member is spaced from a valve seat 136 and a closed position (shown) in which the head of the valve member sits on the valve seat 136 and closes the flow passage portion 127. As will be evident, flow passage portion 127 provides a by-pass flow in which flow from inlet 122 can pass, essentially unrestricted, to outlet 124 when valve 130 is open. When, on the other hand, valve 130 is closed, all flow passes through flow passage portion 125 and the flow restrictor 128 mounted therein.

When valve 130 is closed, the rate of gas flow through gas flow control module 112 is controlled by monitoring pressure sensors 114 and 116. In the embodiment of FIG. 1, and in the normally preferred practice with the gas flow control module 112 of FIG. 3, the pressure drop across the flow restrictor (as determined by the upstream and downstream pressure sensors) is varied using a pressure regulator 120 upstream of the upstream pressure sensor 114.

FIG. 3, however, also illustrates an alternative procedure. In this alternative procedure, the upstream pressure regulator 120 may be omitted or replaced by a constraint outlet pressure drive, a pressure flow regulator, e.g., an adjustable flow control valve 120a (shown in phantom in FIG. 3), may be mounted downstream of pressure sensor 116. In this alternative procedure, the gas flow from source 118 is not controlled by an upstream pressure regulator such as regulator 120. This alternative, and as should be apparent, the rate of gas flow through the gas flow control module 100 and also the pressure of gas downstream of flow restrictor 128, may be varied by opening and closing valve 120a. If, thus, the pressures indicated by sensors 114, 116 show that the pressure drop across flow restrictor 128 is less than that corresponding to the desired rate of flow, the rate of gas flow through (and pressure drop across) flow restrictor 128 may be increased by opening valve 120a. Similarly, closing valve 120a will reduce both the rate of gas flow through, and the pressure drop across, flow restrictor 128.

Figure 4:
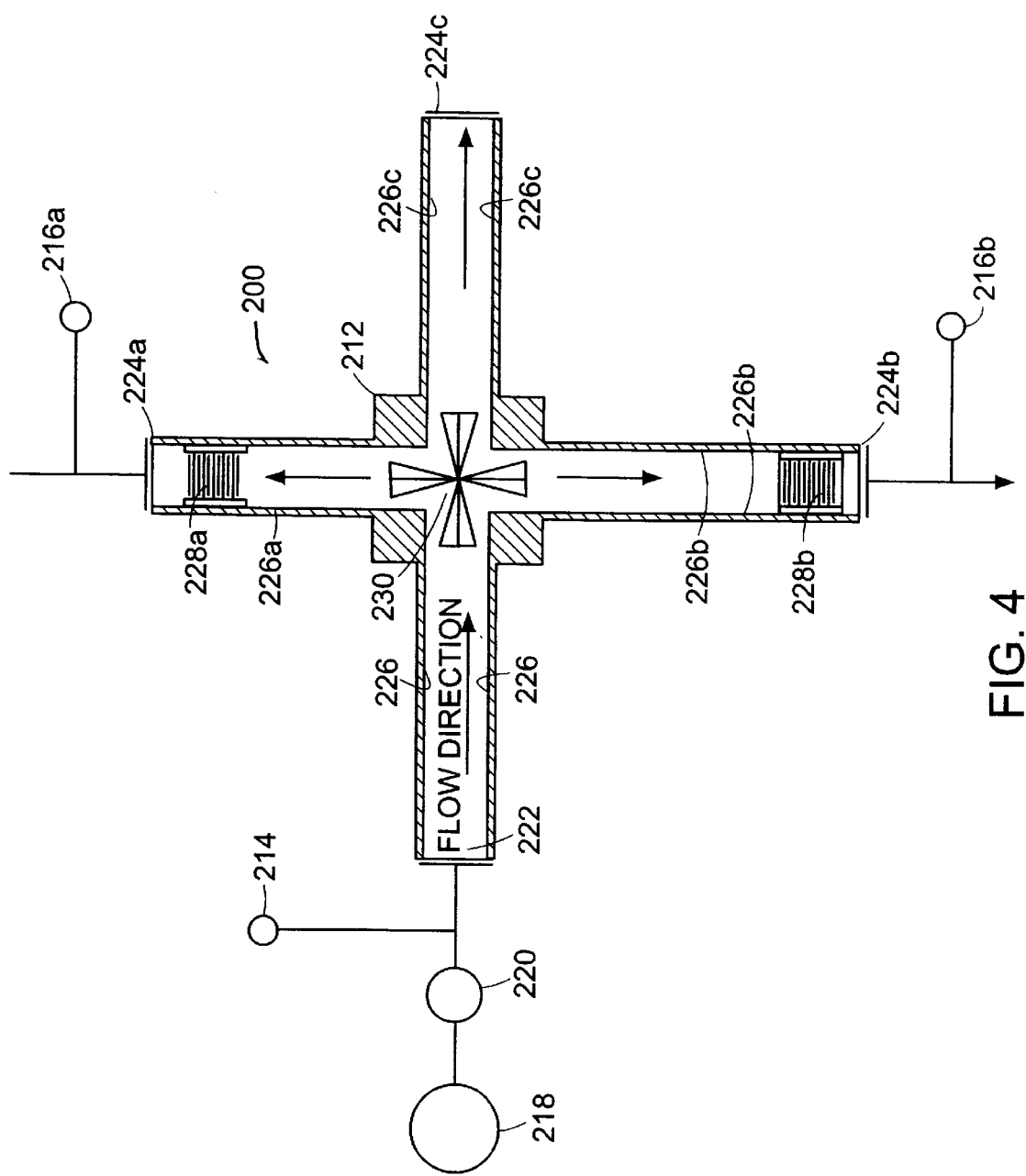

FIG. 4 illustrates a flow control system, generally designated 200. Whereas systems 10 and 100 provided a single controlled flow, system 200 provides two controlled flows and also a by-pass flow. Portions of system 200 that correspond to portions of system 10 are identified using the same reference number, with a "2" prefix added; e.g., the gas flow control system 10 is identified as gas flow control module 12, while that of system 200 is identified as gas flow control module 212.

As shown, gas flow control module 212 has a single inlet 222, and three outlets, designated 224a, 224b and 224c. A conventional four-way valve 230 provides for flow from inlet 222 to a selected of the outlets, and also provides an "off" for preventing any flow through flow manager 200. A manifold system with four on/off control valves (not shown) could be used instead of a four-way valve. One porous sintered metal flow restrictor 228a is mounted in the flow passage 226a leading to outlet 224a, and a second porous sintered metal flow restrictor 228b is mounted in the flow passage 226b that leads to outlet 224b. An upstream pressure sensor 214 is provided between the inlet 222 to flow control module 212 and pressure regulator 220. Two downstream pressure sensors 216a, 216b are provided, one adjacent to each of outlets 224a, 224b, downstream of flow restrictors 228a and 228b. As will be appreciated, pressure sensors 214 and 216a are used to measure the pressure drop across flow restrictor 228a, and pressure sensors 214 and 216b are used to measure the pressure drop across flow restrictor 228b. As also will be appreciated, flow restrictors 228a and 228b may have different pressure-flow characteristics; for example, flow restrictor 228a may be selected to provide 200 SCCM at a 30 PSI pressure drop at a particular outlet pressure while flow restrictor 228b is selected to provide 50 SCCM at either the same or a different pressure drop at the same or a different outlet pressure. Thus, depending on the position of valve 230, outlet 224a may provide a controlled 200 SCCM output, outlet 224b may provide a controlled 50 SCCM output, and the full output gas flow from pressure regulator 220 may be obtained from outlet 224c. If a controlled 200 SCCM output is required, valve 230 is set to direct flow through outlet 224a and an operator (or the system automatically) will monitor sensors 214 and 216a and adjust pressure regulator 220 to maintain a 30 PSI pressure drop across flow restrictor 228a. If, on the other hand, a controlled 50 SCCM output is required, valve 230 directs flow through outlet 224b and the operator monitors sensors 214 and 216b and adjusts pressure regulator 220 to maintain the then-desired pressure drop across flow restrictor 228b. It will be noted that, depending on the particular flow restrictors and desired flows, the pressure of gas output from regulator 220 may be very different when the controlled flow is through flow restrictor 228a and outlet 224a than when the flow is through flow restrictor 228b and outlet 224b.

Figure 5:
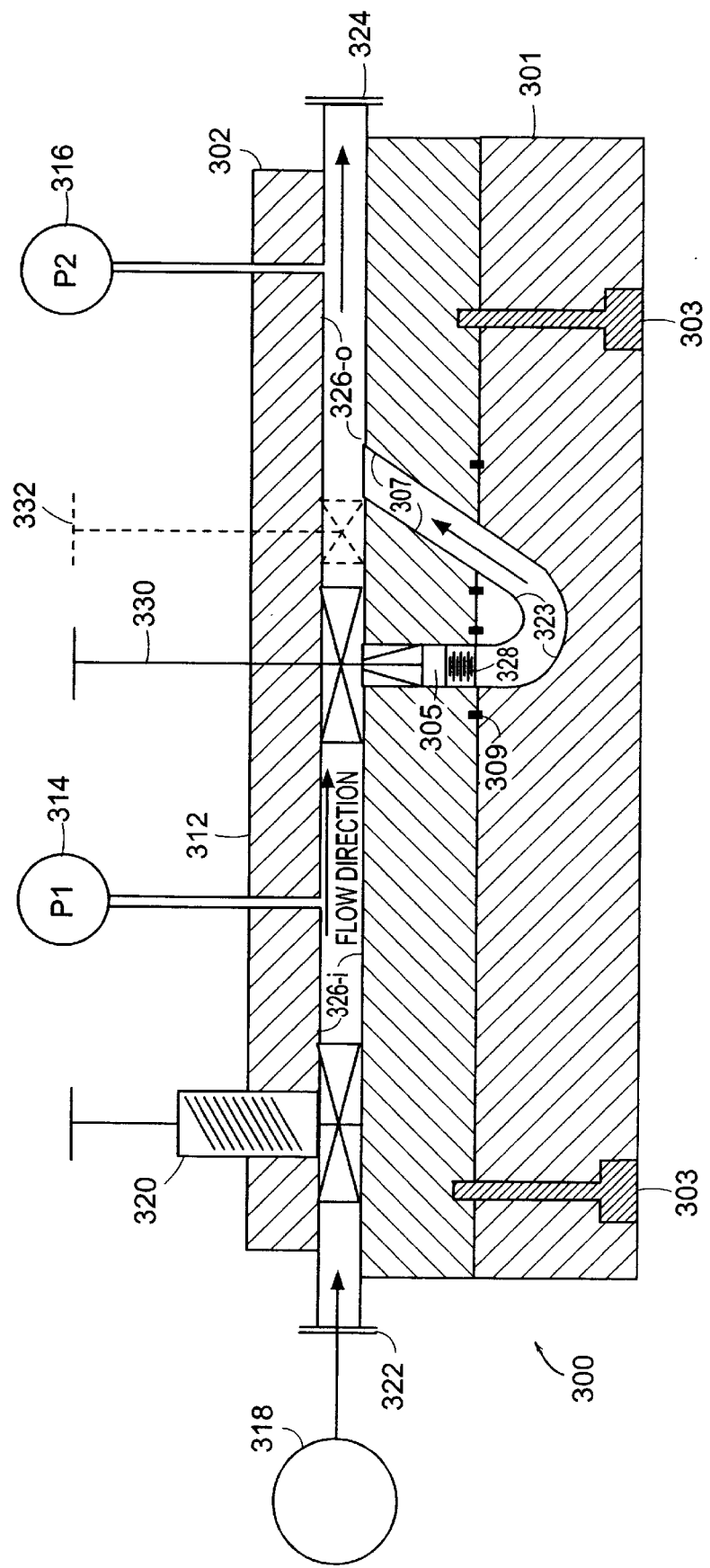

FIG. 5 illustrates a fourth system, generally designated 300, embodying the present invention. As shown, system 300 is modular construction and includes a gas flow control module 312 consisting of a top module 302 with a flow restrictor 328 therein mounted on top of the bottom flow module 301. Bolts 303 hold the two modules together, and seals 309 are provided where flow passages extend from one module into the other. As before, portions of system 300 corresponding to portions of previously discussed systems are identified using the same reference numbers having the same two last digits, with a "3" prefix added.

Top module 302 includes a through-drilled flow passage 326, and two cross-passages designated 305 and 307. Cross passage 305 extends from the center of through passage 326 downwardly to the top of module 301. Cross passage 307 extends diagonally from the bottom of module 302 and intersects drilled passage 326 more closely adjacent the outlet end 324 of passage 326. In module 301, a generally u-shaped passage 323 communicates at one end with cross-passage 305, and at its other end with second cross passage 307.

Flow restrictor 328 is mounted in the lower portion of cross-passage 305, closely adjacent the top of module 301. A three-way manual valve 330 is mounted at the intersection of passages 326 and 305. In its fully closed position, valve 330 prevents through flow from inlet 322 to outlet 324, either directly through passage 326 or through cross passages 305, 307. In a second position, valve 330 closes passage 326 to through flow, but permits flow from the inlet portion 326-i of passage 326, through cross passage 305 and u-shaped passage 323, and then through cross passage 307 and the downstream portion 326-o of passage 326 to outlet 324. In its third position, valve 330 permits flow through the drilled passage 326 while preventing flow through the cross passages 305, 307 and the u-shaped passage 323 in module 301.

Alternatively, to valve 330 a manual on/off valve 332 (shown in phantom in FIG. 5) may be mounted in passage 326 after the intersection of passages 326 and 305 and before the intersection of passage 307 and 326. Valve 332 divides flow passage 326 into two sections, inlet flow passage 326-i and outlet passage 326-o. In its fully closed position, valve 330 directs the gas flow from inlet 322 and flow passage 326-i, through flow passages 305 and 307, and then through flow passage 326-o to outlet 324. In its fully open position, valve 330 allows a bypass flow by permitting flow directly through drilled passage 326, and also permits flow (typically at a much lower rate of flow) through the cross passage 305 with restrictor 328, u-shaped passage 323 and passage 307 in modules 301 and 302. An additional on/off valve (not shown) may also be mounted in flow passage 326-i between pressure regulator 320 and the intersection of flow passages 326-I and 305 to provide positive shut off capability.

Manual pressure regulator 320 is mounted between valve 330 and the inlet to module 302. As in the previously discussed embodiments, inlet pressure sensor 314 monitors the pressure of gas upstream of valve 330 and flow restrictor 328, and downstream pressure sensor 316 monitors the pressure of gas downstream of the valve and flow restrictor.

In the embodiments of FIGS. 1, 3, 4 and 5, the pressure sensors shown are conventional pressure gauges from which an operator may visually determine the particular pressure and thus obtain the data necessary to determine the pressure drop across the relevant flow restrictor. Alternatively, conventional electronic pressure sensors, which provide an analog or digital signal representative of the particular pressure, may be used. Such electronic pressure sensors may provide a printed or other visual output In automated systems, the pressure sensors provide pressure signals to an automatic controller which in turn determines the pressure drop(s) across the flow regulator(s) and controls a pressure regulator as required to maintain the pressure drops that produces the desired flow(s). Similar automated systems are well-known in the art.

Figure 6:
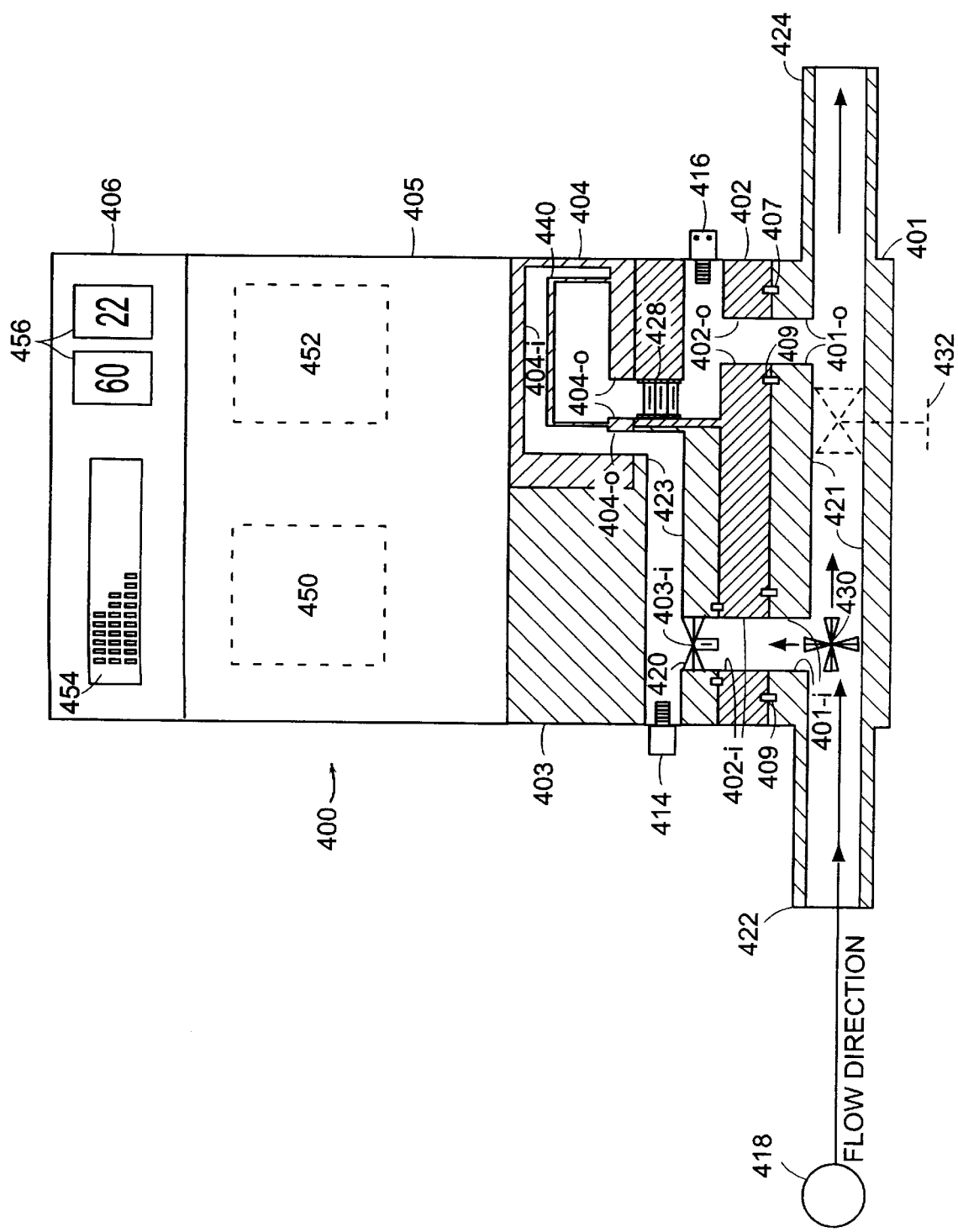

FIG. 6 illustrates a fifth gas flow control system embodying the invention, generally designated 400, which also is of modular construction but which additionally includes a gas flow manager control system. Portions of system 400 which correspond to portions of system 10 are identified using the same reference numbers used in connection with system 10, with the prefix "4" added.

As illustrated, system 400 includes six stacked blocks or modules: bypass valve module 401, restrictor and pressure sensor module 402, pressure control and sensor module 403, filter module 404, electronics module 405, and input/readout module 406. Each module is generally rectilinear in shape, and the various modules are stacked, one above (or in the case of modules 403 and 404, also beside) another. Where flow passages extend from one block into another, the passages are sealed by metal seals or O-rings, e.g., rings 409, at the juxtaposed faces of the adjacent blocks.

By-pass module 401 includes a through flow passage 421 having a gas inlet 422 at one end and a gas outlet 424 at the other end, and also a pair of inlet and outlet flow passages 401-i, 401-o, each of which extends from through passage 421 upwardly to the top face of module 401. A 3-way valve 430 is mounted in flow passage 421 at its intersection with inlet flow passage 401-i. In one position, valve 430 directs flow from inlet 422 directly to outlet 424, in a second it directs the flow from inlet 422 into inlet-flow passage 401-i, and in its third position the valve closes off flow from inlet 422.

An alternative design replaces 3-way valve 430 with a shut off valve 432 (shown in phantom in FIG. 6) located in passage 421 between inlet flow passage 401-i and outlet flow passage 401-o. This alternative design allows flow through the inlet passages 422, 401-i, 402-i, 403-i, 404-i, through flow restrictor 428, and through outlet passages 404-o, 402-o, 401-o and 424 when the valve 432 is fully closed. When fully open, valve 432 allows bypass flow through the flow passage 421 and also, typically at a lesser rate of flow, through the inlet passages 422, 401-i, 402-i, 403-i, 404-i, through flow restrictor 428, and through outlet passages 404-o, 402-o, 401-o and 424.

Restrictor and sensor module 402 is mounted on top of bypass valve module 401. Module 402 is stepped in longitudinal cross section; its thinner portion includes an inlet flow passage 402-i communicating at its lower end with inlet flow passage 401-i of module 401; and its thicker portion has an inlet flow passage 402-i, in which a porous sintered metal flow restrictor 428 is mounted, extending downwardly from the top of module 402 and communicating with an outlet flow passage 402-o that communicates at its lower end with outlet passage 401-i of module 401. A downstream pressure sensor 416 is positioned in a tapped cross-bore that intersects the lower portion of inlet flow passage 402-i below flow restrictor 428 in position to sense the pressure of gas downstream of the flow restrictor.

Pressure regulator module 403 includes a through flow passage 423 including an inlet flow passage portion 403-i communicating at its lower end with passage 402-i of module 402 and an outlet portion 403-o at the other end of the module. A pressure regulator 420 is mounted in inlet flow passage portion 403-i, and an upstream pressure sensor 414 is provided in passage 423 downstream of pressure regulator 420.

Filter module 404 includes an inlet flow passage 404-i communicating with outlet passage flow portion 403-o of module 403, and an outlet flow passage 404-o communicating with inlet passage 402-i of restrictor and sensor module 402. A cup-shaped, sintered porous metal ultra-high efficiency (e.g., 9 log reduction) filter 440 is provided between inlet flow passage 404-i and outlet passage 404-o. Filter 440 is of the general type illustrated by U.S. Pat. Nos. 5,114,447 and 5,487,771 and in co-pending application Ser. No. 08/895,605, now U.S. Pat. No. 5917,066, all of which are hereby incorporated by reference. As is known in the art, such 9 log filters are capable of removing 99.9999999% of the particles in an inlet process stream, determined at the most penetrating particle size which is typically about 0.1 micrometer.

Electronics module 405 includes a memory section 450 containing the Flow Rate Control Data of restrictor 428, and a comparator section 452 that receives data representative of the inlet and outlet gas pressures sensed by pressure sensors 414 and 416 and data representative of the desired flow rate from, for example, input/readout module 406, uses the Flow Rate Control Data from memory section 450 to determine whether the actual flow rate is the same (within any permitted tolerance) with the desired flow, and (if required) outputs a signal to increase or decrease (as required) the pressure output by pressure regulator 420.

Input/readout module 406 includes inputs (e.g., a keyboard entry pad 454) for inputting the desired gas flow rate and, optionally, other inputs such as the type of gas, process cycle times and gas flow periods, so that an operator may visually monitor the operation. Module 406 also includes outputs (e.g., digital displays 456) which show process or flow related data including the real-time inlet and outlet pressures, the desired (or set) flow rate, and the actual flow rate.

In operation, the empirically determined Flow Rate Control Data for the flow restrictor 428 and the specified process gas included in system 400 is loaded into the memory section of electronics module 406 by the user or, if the flow restrictor is that originally supplied, by the manufacturer of the system 400. Gas inlet 422 is connected to a source of process gas 418 and gas outlet 424 is connected to the inlet of the semiconductor manufacturing operation that requires the process gas. The user enters the desired flow rate, and perhaps other process data depending on the particular system, into module 406 using keyboard entry pad 454. A valve control sets 3-way valve 430 in the desired (off, controlled flow, by-pass flow) position.

When valve 430 is set to direct flow in the controlled flow mode, i.e., into system 400 through inlet 422, and then through filter 440 and flow restrictor 428 to system outlet 424, upstream and downstream sensors 414 and 416 measure the gas pressures upstream and downstream of flow restrictor 428. The data from sensors 414, 416, together with the desired flow rate data from module 406, is sent to the electronics module 405. Electronics module 405, in turn, continuously monitors the input data and continuously adjusts (as required) pressure regulator 420 to insure that the actual flow through the system precisely corresponds to that desired.

Other Embodiments

The flow restrictor used in the above-described embodiments is a porous sintered element of the type now being made and sold by, among others, Mott Corporation. It will be appreciated that other three-dimensional porous elements also may be used. For example, porous metal flow restrictors are also manufactured by GKN Sinter Metals (Terryville, Conn.), SSI Sintered Specialties (Janesville, Wis.) and Chand Associates (Worcester, Mass.). Porous sintered metal media such as those used by Pall Corp. and Millipore Corporation for high efficiency gas filters could be used for flow restrictors, particularly if additional processing were employed to control the density and flow properties more accurately than is typically required for filter applications. Other porous materials such as ceramics and plastics, high density foams, and foam/powder composites such as those disclosed in co-pending U.S. patent application Ser. No. 09/074,957 filed May 8, 1998, now U.S. Pat. No. 6,080,217 (which is hereby incorporated by reference) also could be employed as the porous elements in flow restrictors. In the broadest sense, and as used in this application, the term "flow restrictor" encompasses any three-dimensional porous structure that defines a through-flow matrix including a multiplicity of pores or passages through which gas flows such that, for a particular gas and over a range of pressures, the rate of gas flow through the structure depends on the pressure drop across the structure and the pressure drop-flow rate characteristics are well defined.

It will be further appreciated that the scope of the present invention is not limited to the above-described embodiments, but rather is defined by the appended claims; and that these claims will encompass modifications of and improvements to what has been described.

What is claimed is:

1. The method of controlling flow including:
   providing a flow restrictor comprising a three-dimensional porous structure defining a through-flow matrix having a plurality of pores and having known pressure drop-flow rate characteristics;
   determining a desired rate of fluid flow through the flow restrictor;
   causing fluid to flow through the flow restrictor;
   determining the pressure drop across the flow restrictor of the fluid flowing therethrough; and
   adjusting the pressure drop across the flow restrictor of the fluid flowing through the flow restrictor such that the pressure drop of fluid across the flow restrictor corresponds to the desired rate of fluid flow.

2. The method of claim 1 including comparing the pressure drop of the fluid flowing through the flow restrictor with data representative of the known pressure drop-flow rate characteristics of the flow restrictor and adjusting the pressure of fluid upstream of said restrictor on the basis of said comparison.

3. The method of claim 1 including comparing the pressure drop of the fluid flowing through the flow restrictor with data representative of the known pressure drop-flow rate characteristics of the flow restrictor and adjusting the pressure of gas downstream of said restrictor on the basis of said comparison.

4. The method of claim 1 wherein said flow restrictor comprises porous sintered metal.

5. The method of claim 1 including providing a first sensor to determine the pressure of fluid upstream of said flow restrictor and to provide data indicative of said upstream pressure and a second sensor to determine the pressure of fluid downstream of said restrictor and provide data indicative of said downstream pressure, and wherein said pressure drop is determined on the basis of a comparison of said data.

6. The method of claim 5 including providing electronic signals indicative of the desired rate of fluid flow, of said data indicative of said upstream pressure, of said data indicative of said downstream pressure, and of said data representative of the known pressure drop-flow rate characteristics of the flow restrictor.

7. The method of claim 6 wherein the pressure of the fluid upstream or downstream of said flow restrictor is adjusted on the lower of said electronic signals.

8. The method of claim 1 including providing a pressure regulator to adjust said pressure of fluid upstream of said flow restrictor.

9. The method of claim 1 wherein the pressure drop across said flow restrictor is monitored substantially continuously over a period of time, and during said period the pressure drop of fluid flowing through said restrictor is adjusted as required to maintain fluid flow through said flow restrictor at substantially said desired rate of flow.

10. The method of claim 1 including providing a memory containing data indicative of said known pressure drop-flow rate characteristics and a first sensor providing data indicative of pressure of fluid upstream or downstream of said flow restrictor, and wherein the pressure drop of fluid flowing through said restrictor is adjusted based on said data contained in said memory and data provided by said first sensor.

11. The method of claim 10 including a second sensor providing data indicative of pressure of fluid downstream of said flow strictor, wherein first sensor provides data indicative of pressures of fluid upstream of said flow restrictor, and wherein said pressure drop of fluid flowing through said restrictor is adjusted based on said data contained in said memory and data provided by said first and second sensors.

12. The method of any of claims 1–11 wherein the fluid is a gas.

* * * * *